(12) United States Patent
Matalon

(10) Patent No.: US 8,069,849 B2
(45) Date of Patent: Dec. 6, 2011

(54) PARABOLIC SOLAR COLLECTOR

(75) Inventor: David Matalon, Brooklyn, NY (US)

(73) Assignee: Matalon Energy, LLC, New York, NY (US)

( * ) Notice: Subject to any disclaimer, the term of this patent is extended or adjusted under 35 U.S.C. 154(b) by 323 days.

(21) Appl. No.: 12/371,260

(22) Filed: Feb. 13, 2009

(65) Prior Publication Data

US 2010/0206296 A1   Aug. 19, 2010

(51) Int. Cl.
*F24J 2/24* (2006.01)
*F24J 2/38* (2006.01)
*F24J 2/12* (2006.01)

(52) U.S. Cl. ......... 126/651; 126/600; 126/690; 126/694

(58) Field of Classification Search .................. 126/651, 126/600, 690, 694
See application file for complete search history.

(56) References Cited

U.S. PATENT DOCUMENTS

| | | | |
|---|---|---|---|
| 4,035,065 A | 7/1977 | Fletcher et al. ............. 350/310 |
| 4,191,169 A | 3/1980 | Hyman | |
| 4,220,136 A | 9/1980 | Penney ........................ 126/424 |
| 4,249,513 A | 2/1981 | Dostrovsky .................. 126/438 |
| 4,266,112 A | 5/1981 | Niedermeyer ................ 219/121 |
| 4,273,107 A | 6/1981 | Methvin | |
| 4,296,737 A | 10/1981 | Silk | |
| 4,332,238 A | 6/1982 | Garcia, Jr. | |
| 4,745,965 A | 5/1988 | Katsura et al. | |
| 4,804,971 A * | 2/1989 | Bruns et al. ................. 343/840 |
| 5,069,540 A | 12/1991 | Gonder | |
| 6,036,323 A | 3/2000 | Meijer ......................... 359/851 |
| 6,705,311 B1 | 3/2004 | Schwartzman et al. | |
| 6,832,608 B2 | 12/2004 | Barkai et al. | |
| 7,055,519 B2 | 6/2006 | Litwin | |
| 7,109,461 B2 | 9/2006 | Lasich | |
| 7,252,084 B2 | 8/2007 | Pawlenko et al. | |
| 2004/0085659 A1 | 5/2004 | Lasich .......................... 359/853 |
| 2004/0089963 A1 * | 5/2004 | Olari et al. ...................... 264/28 |
| 2005/0133082 A1 | 6/2005 | Konold et al. | |
| 2005/0281999 A1 * | 12/2005 | Hofmann et al. ......... 428/304.4 |
| 2008/0047548 A1 * | 2/2008 | Konietzny et al. ............. 126/709 |
| 2008/0078379 A1 | 4/2008 | Kimura et al. | |
| 2008/0078380 A1 | 4/2008 | Kimura et al. | |
| 2008/0083405 A1 | 4/2008 | Kimura et al. | |
| 2008/0127967 A1 | 6/2008 | Kimura et al. | |
| 2008/0257335 A1 | 10/2008 | Lowstuter | |

(Continued)

FOREIGN PATENT DOCUMENTS

DE    28 27 007    1/1979

(Continued)

OTHER PUBLICATIONS

Pettit and Sowell, "Solar Absorptance and Emittance Properties of Several Solar Coatings", J. Vac. Sci. Technol., vol. 13, No. 2, Mar./Apr. 1976, pp. 596-602.*

*Primary Examiner* — Kenneth Rinehart
*Assistant Examiner* — William Corboy
(74) *Attorney, Agent, or Firm* — Fitzpatrick, Cella, Harper & Scinto

(57) ABSTRACT

A passive solar collector utilizes a support constructed of precisely machined foam to simplify the construction and calibration of the reflective surface. Further improvements include sensor-based positioning, and a receiver having inflow and outflow conduits adapted to improve thermal efficiency.

8 Claims, 4 Drawing Sheets

U.S. PATENT DOCUMENTS

| | | |
|---|---|---|
| 2008/0276929 A1 | 11/2008 | Gerwing et al. |
| 2008/0289334 A1 | 11/2008 | Orosz et al. |
| 2009/0013990 A1 | 1/2009 | Mattioli .................. 126/600 |
| 2009/0027792 A1 | 1/2009 | Dreyer et al. ............. 359/883 |

FOREIGN PATENT DOCUMENTS

| | | |
|---|---|---|
| EP | 1 826 505 A1 | 8/2007 |
| GB | 989 395 | 4/1965 |
| WO | 02/073098 A2 | 9/2002 |

\* cited by examiner

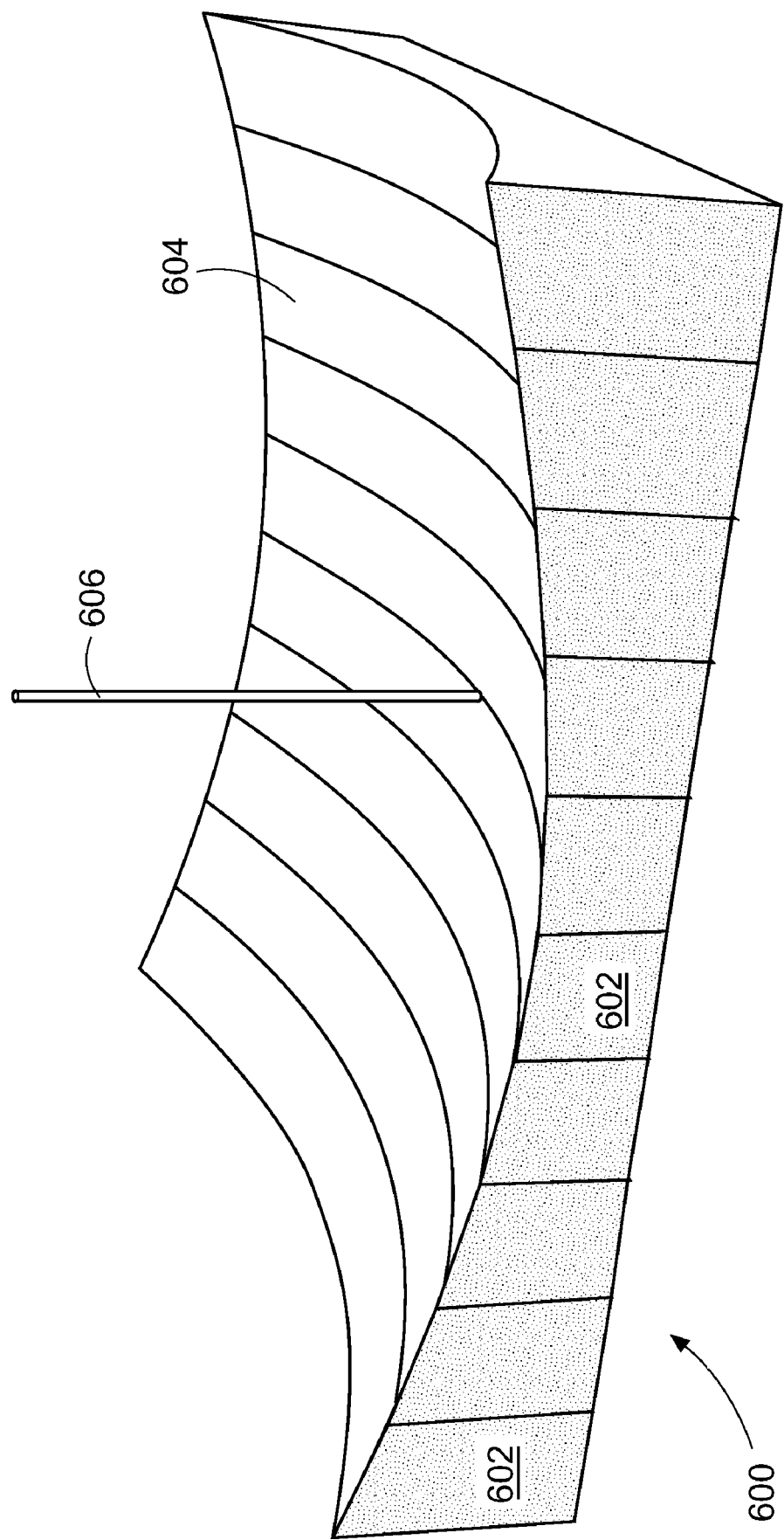

PARABOLIC SOLAR COLLECTOR

BACKGROUND OF THE INVENTION

1. Field of the Invention

The present invention is directed to the field of passive solar collectors, including improvements in the support for the reflective surface of the collector and methods of making, improvements in the receiver element, and controls for moving the collector to track the apparent trajectory of the sun.

2. Description of Related Art

The development of solar technology promises to reduce the damage to the earth's environment brought about by the extraction and burning of fossil fuels. Accordingly, increased attention has been devoted recently to ways to make this technology more efficient and economical.

Solar energy is conventionally harnessed in one of two ways: with a photovoltaic device, in which solar radiation generates electric current directly; or with a passive solar collector, in which solar radiation is incident on a receiver carrying a heat transfer fluid. The heat transfer fluid may then be used to drive a turbine, or other power generating device.

Passive solar power generation facilities have been built on a large scale in the United States, wherein heated water drives turbines generating power in the 10s to 100s MW range per facility. However, the large scale and technological complexity of these apparatus has hampered their development. In particular, it has not generally been possible to expand this technology downward, into applications where less power is generated, or where the heated water is used for heat or hot water directly, as opposed to for generating power. The glass reflectors and complex tracking mechanisms used in these power generating facilities are prohibitively expensive for the smaller end use.

There are also commercial solar thermal energy systems operated for medium temperature usage, in a range of about 80° C. to about 250° C. Typically, these are flat collectors set on a fixed inclination facing south.

A more efficient solution is to provide a focusing reflective surface in the shape of a parabola, so that the sun's rays are concentrated on a receiver positioned in the focal line of the parabola carrying a heat transfer fluid. The collector pivots to track the apparent movement of the sun from East to West.

One problem with the focusing collector systems in the past has been the difficulty of forming and calibrating a reflective surface in the required parabolic shape. The curved surface of the reflector in these apparatus must be precisely calibrated, which requires skill and training.

U.S. Pat. No. 5,069,540 proposes a method for making a solar collector from a mold using an amorphous, hard-curing material, such as stucco or cement, to address the problem of maintaining a surface with specified dimensions. U.S. Patent Application Publication No. 2008/0078380 describes a complicated system of brackets designed to support reflector panels at a given curvature. Neither of these systems provides a reliable, inexpensive system for providing a reflector with a desired curved surface.

Thus, there is a continued and increasing need for systems wherein the curvature and position of the reflector can be rapidly and reliably determined.

Conventionally, the receiver element of a passive solar collector has been encased in an evacuated glass tube, such as disclosed in U.S. Patent Application Publication No. 2008/0078380. Such devices improve collector efficiency by reducing the convective heat loss from the receiver to the surrounding environment, but such systems are complex, costly, and difficult to maintain. Thus, there is a need in this art for a receiver element that is efficient without requiring a vacuum tube.

A solar collector works most efficiently if it is pointed at the sun. Although various tracking systems are known, some of which may be adapted for use with a solar collector, there continues to be a need in the art for a tracking system that points the collector at the sun so that the maximum amount of solar radiation is collected, and such that temporary cloud cover, night fall, and other low-sunlight incidents do not cause a failure of the system to accurately track the apparent trajectory of the sun.

SUMMARY OF THE INVENTION

In one aspect, the invention is a parabolic solar collector, comprising: a reflector (which may be in the shape of a parabolic trough or a parabolic dish, for example) having a focal line or focal point, and a receiver carrying a heat transfer fluid positioned at the focal line or focal point. The reflector is adhesively attached to, and supported by, a foam base. The foam base has a curved surface determining the focal line or focal point. A rigid cradle supports the foam base and surrounds the receiver.

In another aspect, the invention is a novel receiver element for a solar collector having a plurality of inflow conduits carrying a heat transfer fluid in a first direction along the longitudinal axis of the solar collector, and one outflow conduit in fluid communication with the plurality of inflow conduits carrying the heat transfer fluid in the opposite direction along the longitudinal axis. The inflow conduits are positioned above and contacting the outflow conduit. In preferred embodiments, a pair of inflow conduits is positioned above a single outflow conduit.

In still another aspect, the invention is a novel tracking and control system for controlling the inclination of a solar collector. The tracking system comprises: a motor adapted to pivot the collector to an inclination angle; an optical sensor; and first and second heat sensors which are positioned on opposite sides (East and West) of a longitudinal axis defined by the receiver. A controller is responsive to the optical sensor and the heat sensors to control the inclination angle of the reflector.

In embodiments, a third heat sensor is positioned between the first heat sensor and the second heat sensor, and below the receiver. The inclination of the reflector is controlled, in a first instance, in a direction toward the first or second heat sensor sensing a lower temperature, tending to minimize the difference in the temperature sensed by the first and second heat sensors. When the third heat sensor senses a higher temperature than either of the first or second heat sensors, then the controller inhibits movement of the collector.

The collector may be provided with systems to capture or use the heat collected in the collector, including a storage pump, responsive to the control elements, for controlling the flow of heat transfer fluid through the receiver, and a storage tank.

Another important aspect of the invention is embodied in the method of making, including the steps of cutting a rigid foam material to form a foam base having a curved focusing surface with predetermined dimensions; adhering a reflective material on the focusing surface; assembling the base and the reflective material in a cradle; and positioning a receiver carrying a heat transfer fluid with respect to the base and cradle so that solar rays incident on the focusing surface are focused on the receiver. The step of cutting the reflector support from foam permits computer-aided manufacturing of a precisely dimensioned reflector surface at relatively low cost, using a computer numerical control (CNC) apparatus. This technique solves a long standing problem in the art associated with maintaining and calibrating the reflector surface in a passive solar collector.

BRIEF DESCRIPTION OF THE DRAWINGS

FIG. 6 is a depiction of another embodiment of a solar collector according to the invention, in the shape of a parabolic dish.

DETAILED DESCRIPTION OF THE PREFERRED EMBODIMENTS

Figure 1:
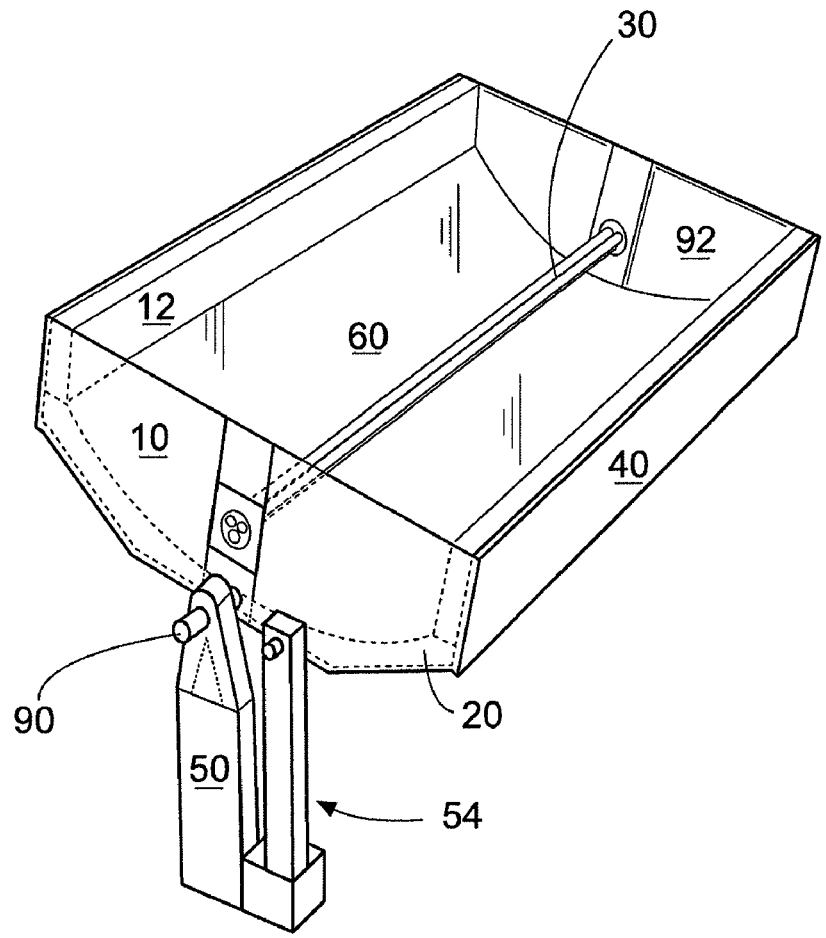
FIG. 1 is a perspective view of a solar collector according to the invention.

In the exemplary embodiment depicted in FIG. 1, the reflector 10 is in the shape of a parabolic trough. Other focusing surfaces are possible, such as a parabolic dish, shown in FIG. 6.

As is well known, a parabolic reflector focuses parallel rays of light to a focal point. The general equation for a parabola is $y=ax^2$, and the focal point is ¼ a, which is invariant with x. Where the parabola is extended to form a trough, the plane equation becomes $y=x^2/4f$. The focal point becomes a focal line which, in the finished apparatus, is where the receiver 30 is positioned to receive the concentrated rays of sunlight.

In the collector of FIG. 1, parabolic reflector 10 is made of a pliable, highly reflective material which is durable, resistant to UV radiation and heat, and which can be conformed to the surface of foam base 20. The presently preferred material is a polished aluminum sheet having a thickness of about 1 mm to about 4 mm, most preferably about 1.5 mm, although the exact material used for the reflector is not critical to the invention. Aluminum foils having other thicknesses may be used, and other sheet metal materials may be used. Alternatively, polymeric films coated with a metal film, or otherwise provided with a reflective surface, may be used as the reflector material. In yet another embodiment, reflective paint may be applied directly to the surface of the foam base 20. In preferred embodiments, the reflector has reflectivity of at least about 95%, more preferably greater than about 97% reflectivity, and most preferably, greater than about 98% reflectivity.

The preferred foams for constructing the base 20 are thermofusible expanded foams that melt at a relatively low temperature so that they can be cut with a hot wire foam cutter responsive to computer numerical control (CNC). Acceptable foams include (without limitation) extruded polystyrene, expanded polystyrene, polymethacrylimide low density rigid foam, flexible expanded polypropylene foams, and polyethylene foams. A presently preferred foam material for the base is an expanded polystyrene, available from Georgia Foam, Inc., Gainesville, Ga. The foam should be sufficiently rigid to support the reflector without deforming, but light enough to be easily manufactured and transported. The density of the foam materials is preferably in a range of about 0.5 lb/ft$^3$ to about 10 lb/ft$^3$, more preferably in a range of about 0.9 lb/ft$^3$ to about 2.2 lb/ft$^3$. A presently preferred material has a density of about 1.5 lb/ft$^3$. Although foam has been used as an insulator in solar collectors according to the prior art, foam has not heretofore been used as a structural support element. Thus, an important aspect of the present invention is a foam component having a parabolic surface, such as may be cut according to predetermined dimensions with a CNC apparatus. Of course, the foam must be sufficiently resistant to heat that it will not deform in the sunlight.

The foam base 20 with the adhered reflector 10 is shown assembled in cradle 40, which may be made of any rigid material, such as wood, metal, or polymer or combination thereof, capable of securely holding the base, and which can be formed to allow appropriate assembly with receiver 30, and mounting 50. Preferably, the cradle is made out of sheet metal, which is light, durable and resistant to heat.

A transparent cover 60 seals a space above the reflector 10 and the receiver 30, to protect the reflector and other collector elements from the environment and to provide an insulated enclosure for the receiver. Light incident on the receiver may be maximized using low iron tempered glass for the cover. Low iron tempered glass is available from many suppliers, and is sometimes referred to as very clear glass or ultra-clear glass. A standard sheet of ⅛ in (3 mm) low iron tempered glass preferably has a transmittance of greater than about 90% for total solar radiation, more preferably greater than 91%, and most preferably a transmittance of total solar (TS) radiation is 91.6% or greater.

Providing a cover 60 on the apparatus has the additional advantage of increasing the ambient temperature around the receiver. A temperature in this space in a range of 30° C. to 90° C. is suitable to maximize thermal efficiency for many applications. In the prior art, the use of a cover is typically avoided in favor of complicated vacuum systems for insulating the receiver. It has surprisingly been found that using a cover as described herein, and providing certain improvements to the receiver element, delivers the same or better thermal efficiency at significantly lower costs.

Insulating foam 12, which may be the same or different material as the foam material used for the base 20, may be positioned along the sides of the cradle 40 beneath cover 60. Additional foam may be provided along the north wall 92, perpendicular to the longitudinal axis of the collector.

A reflective polished aluminum sheet may be provided on the south wall of the collector to address the problem of the shadow cast by the end wall and increase the amount of incident radiation focused on the receiver.

Figure 2:
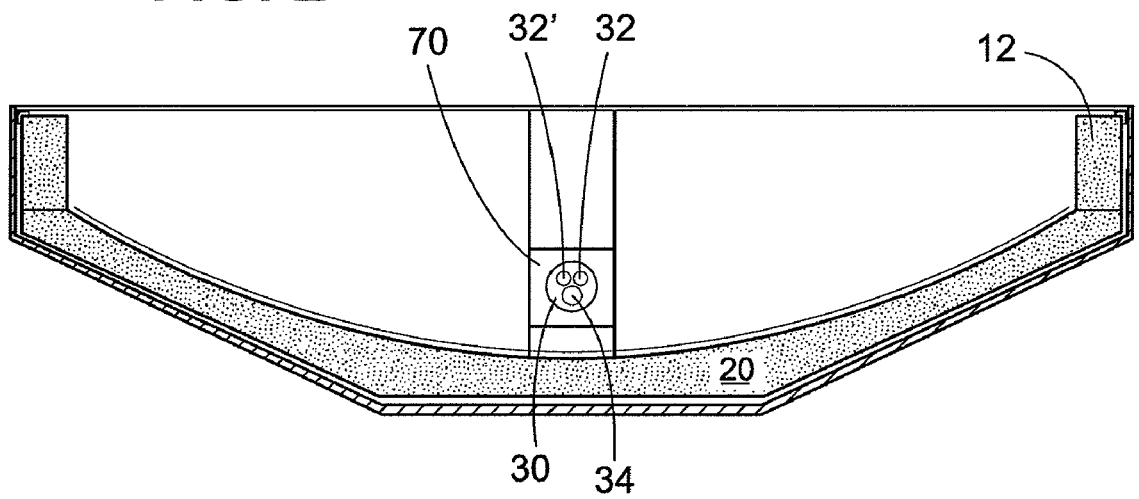
FIG. 2 is a side elevation view of a solar collector according to the invention, excluding the mounting elements.

In the side elevation view of FIG. 2, a preferred embodiment of the receiver 30 is shown including receiver inflow conduits 32, 32' and outflow conduit 34. These elements together constitute receiver 30, which is mounted in a window member 70 on the side wall of the collector. The window member allows for installation of the receiver, and for adjusting the position of the receiver with respect to the curved surface of the reflector.

Figure 3:
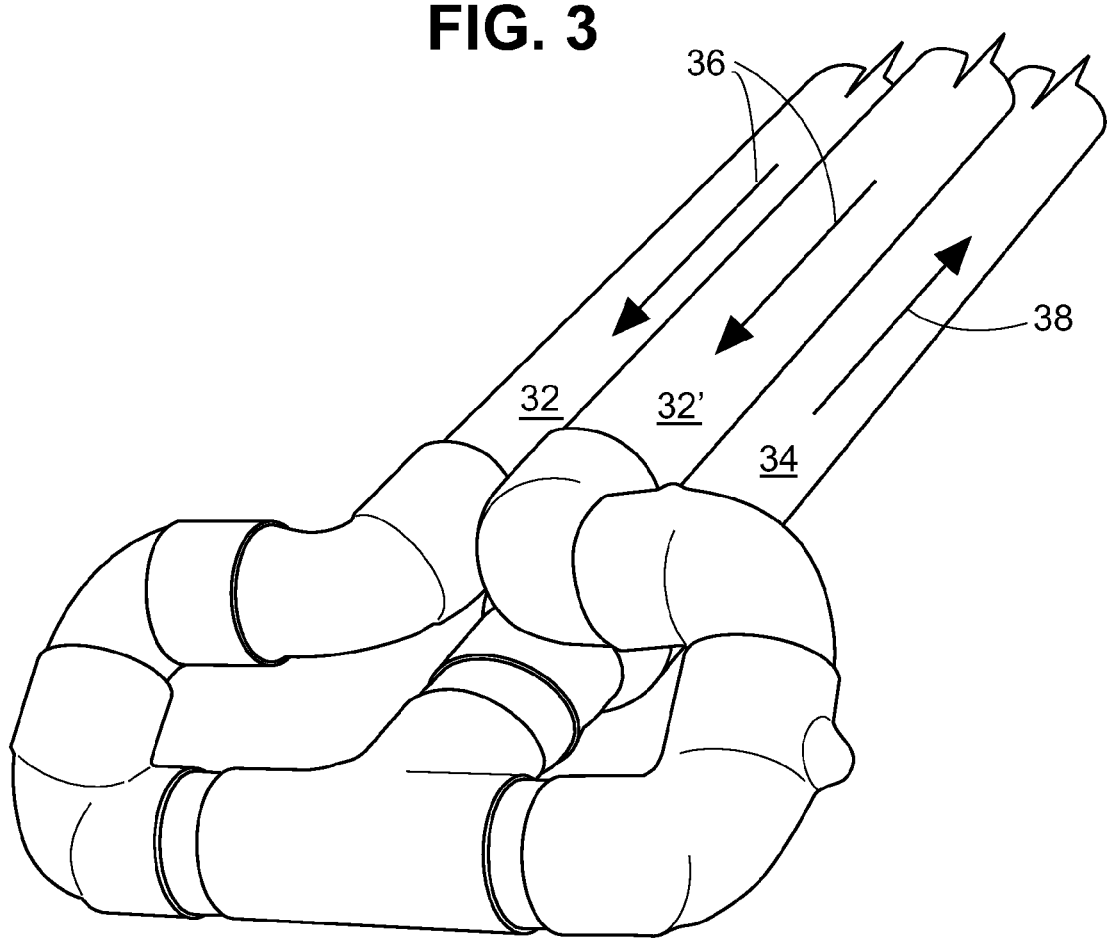
FIG. 3 is a detail view of a receiver element according to the invention.
Figure 4:
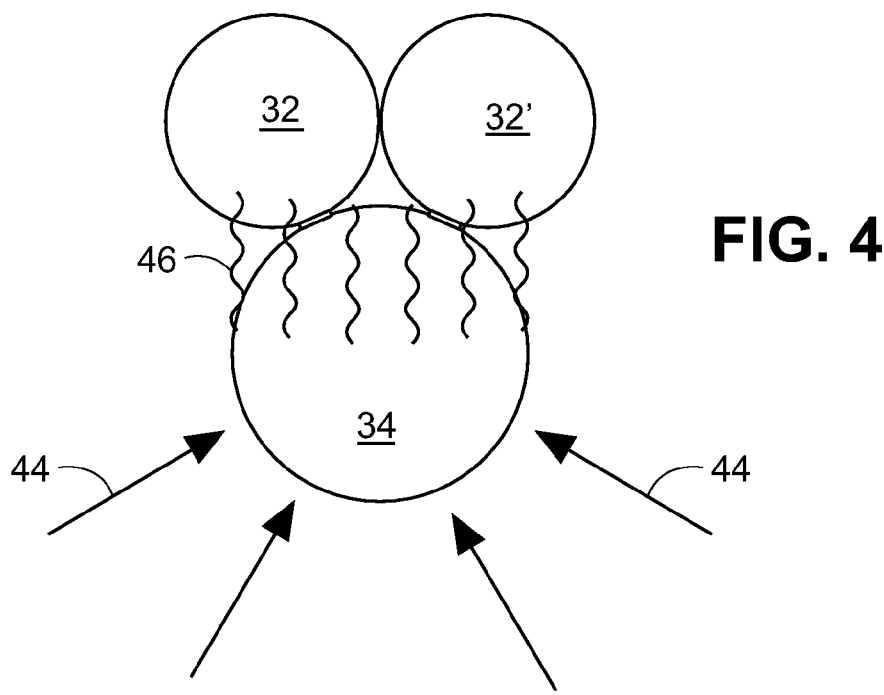
FIG. 4 is a side view of the receiver element, showing the pattern of radiative heat transfer into the receiver from the reflector, and of conductive heat transfer from the receiver outflow tube to the receiver inflow tube.

In the detail view of the receiver shown in FIG. 3, a plurality of inflow conduits 32, 32' are shown transporting a heat transfer fluid in a first direction designated by arrow 36 along the longitudinal axis of the collector, while outflow conduit 34 transports heat transfer fluid in the opposite direction, designated by arrow 38. The smaller inlet conduits are located above and contacting the larger outflow conduit. As shown in FIG. 4, solar rays 44 incident on the reflector are focused on the conduit 34, and inflow conduits 32 and 32' are positioned in contact with conduit 34 to absorb heat by conduction, indicated by lines 46. Thus, the combined outside diameter of the inflow conduits 32, 32' is preferably larger than the diameter of the outflow conduit 34. The inflow conduits are positioned above and contacting the outflow conduit to ensure that the amount of heat exchanged by conduction from the outflow conduit is maximized.

The receiver may be provided with a coating to increase absorptivity for short wavelength radiation and reduce emissivity for long wavelength radiation. This ensures that the receiver absorbs solar radiation well compared to an uncoated pipe, and that it does not radiate thermal energy very well. Preferably, the receiver has an absorbtivity of at least about 0.88 at wavelengths below 5 microns, more preferably the absorptivity is greater than 0.92 at wavelengths below 5 microns, and most preferably greater than 0.94 at wavelengths below 5 microns. Emissivity for total solar radiation is less than 0.50, preferably less than 0.40, more preferably less than 0.30 and most preferably less than 0.10 at typical operating temperatures. Although black chrome paint or the like may be used to obtain a benefit in some instances, specialized selective coatings based on a silicone polymer binder are preferred, such as are commercially available from Solec, Inc., Ewing, N.J. under the tradename Solkote™ Selective Solar Coating. Those of skill in the art recognize that absorptivity and emissivity depend also on the thickness of the coating applied, the substrate material, and the shape of the substrate material.

A solar collector according to the invention may be operated at a temperature in a range of about 85° C. to about 400° C., which refers to the temperature of the heat transfer fluid at the exit of the receiver. A pump start signal is typically set at about 85° C., as little useful heat can be captured below this temperature. Operation above 375° C. tends to be impractical to maintain at reasonable flow rates, and the sensor equipment may be more prone to failure at these high temperatures. The system according to the invention is typically adapted for medium temperature use, in the range of about 150° C. to about 250° C. The temperature selected for the heat transfer fluid depends on how the apparatus is used. For example, drying is a low temperature application which may require a heat transfer fluid having a temperature of about 150° C. If hot water for business or residential use is required, the temperature may range to 250° C. The temperature of the heat transfer fluid exiting the receiver is governed by the flow rate. A slower flow rate allows for greater accumulation of heat in the receiver and a higher exit temperature.

The flow rate is also related to the volume of the receiver (the cross-sectional area of both inflow and outflow conduits multiplied by the length of the collector). For the approximately 8'×4' units described, receiver volume may range from about 1.0 to about 3.0 liters. A practical heat transfer fluid flow rate for a receiver of this size is about 8 l/min to about 10 l/min. Where water is used as a heat transfer fluid the difference in temperature between the receiver inlet and the receiver outlet is in a range of about 1° C. to about 5° C., most preferably about 3° C., but this variable is highly dependent on the use selected for the apparatus.

"Thermal efficiency" is used herein to refer to the fraction of solar radiation incident on the collector that is captured as heat. Generally, the total solar radiation incident on a surface is estimated. Estimates of solar radiation are available by geographic location and time of year from different sources. In the Example below, 1000 W/m$^2$ is the estimated solar radiation in the New York, N.Y. area in summer, where the units were tested. The thermal efficiency of a solar collector according to the invention, calculated with respect to an estimated solar radiation for a given region and time of year, is in a range of about 60 percent to about 70 percent.

In some instances a vertical end wall reflector, perpendicular to the axis of the receiver, may be provided on the north wall of the cradle. This compensates for a loss of reflected light due to the shadow cast by the end wall.

Although the foregoing description has been limited to a single collector, one of ordinary skill in the art understands that an array of collectors may be used. For example, individual trough-shaped solar collectors may be linked so that outflow from a first collector unit is directed to and becomes the inflow for a second collector unit, and so on. In this context, where several collectors are joined serially, certain sidewalls 92 shown in FIG. 1 may be omitted.

FIG. 6 depicts an embodiment of the invention where the reflector surface is in the shape of a parabolic dish 600. In the case of a parabolic dish, the foam base may be constructed of foam segments 602, each of which has a curve in a transverse and longitudinal direction. The advantage of using foam as a structural material in this context is especially apparent, as such structures would clearly be especially difficult or impossible to fabricate at a reasonable cost using prior art methodology. Receiver 606, shown schematically, passes through the focal line, vertically through the vertex of the parabola. Strips of reflector material 604 are adhesively applied to the foam base segments 602.

Mounting system 50 is adapted to permit pivoting of the reflector about a shaft 90. For example the reflector may pivot so that the reflector completes an arc of up to about 170 degrees to track the apparent trajectory of the sun. Motor 54 generally has enough power to exert 600 lbs of push/pull force, sufficient to move the reflector and prevent the position of the reflector from being moved by wind or inadvertent jostling. Preferably, motor 54 is a linear DC drive motor with an actuator having 2000 lb of push/pull force with 27 volts of power. The use of a linear drive motor has been made possible because of the light weight foam base. The linear motor represents a significant improvement over motors used for this purpose in the prior art, which typically have a gear and chain. These elements introduce more "play" into the system and require increased maintenance. The use of a linear DC motor obviates many problems associated with gear and chain motors.

Figure 5:
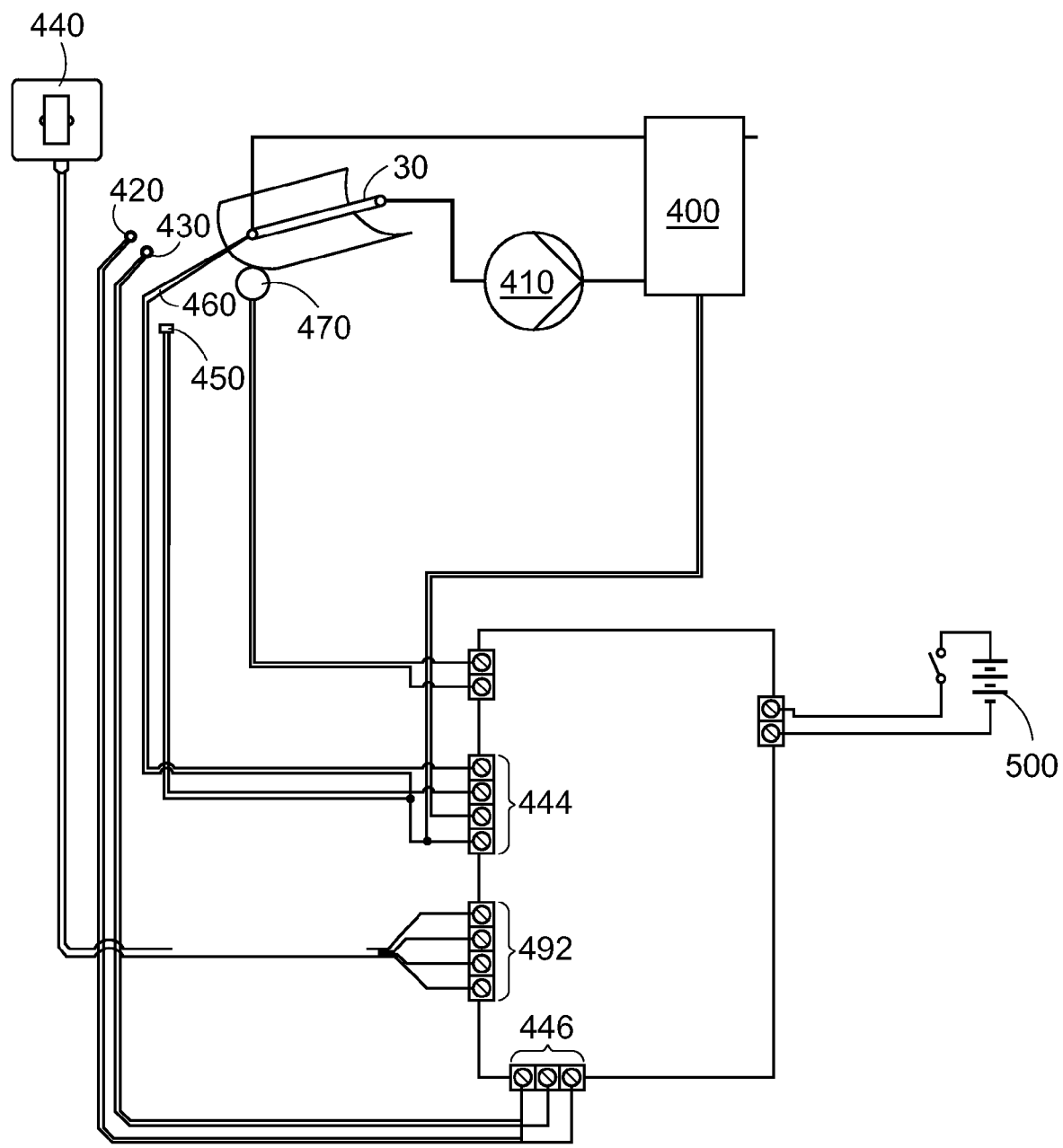
FIG. 5 is a schematic view of a collector system according to the invention including system components and control elements.

Collector system components and control elements are depicted schematically in FIG. 5. A heat transfer fluid circulates from primary storage tank 400 through storage pump 410 and receiver 30. Storage pump circulates heat transfer fluid when the collector is operating, i.e., when the collector is pointed at the sun and the heat transfer fluid is being heated. Power is supplied from power source 500. At night, and during other non-operation conditions, the storage pump 410 receives a shut off signal from optical sensor 440 to return the reflector to a parked condition, facing East. A shut off signal may also be provided in the case of a low temperature signal received from a sensor (not shown) detecting the temperature of the circulating heat transfer fluid.

During normal operation, the inclination of the collector is controlled by heat sensors. In certain preferred embodiments, a first heat sensor 420 and a second heat sensor 430 are positioned on opposite sides of a longitudinal axis defined by the receiver (generally to the East and West of the axis, as the tracking system follows the sun on its East-to-West trajectory). These elements are shown schematically in FIG. 5, but their position with respect to the receiver is not shown. A third heat sensor 450 is positioned between the first heat sensor and the second heat sensor and below the receiver. On a continuous basis, as the collector is tracking, the inclination angle of the collector is adjusted in a direction toward the first or second heat sensor sensing a lower temperature. The controller thus seeks to minimize the temperature difference between the first heat sensor and the second heat sensor so that the reflector is in the optimal position to receive solar radiation. The third heat sensor 450 is used as a final tune, inhibiting the motor from moving, and fixing the inclination angle of the collector, when the third heat sensor senses a temperature higher than the temperature of the first and second heat sensors.

Other control elements include an ambient temperature sensor (not shown) to determine the temperature in the space under the cover of the collector, fluid temperature sensors 460 to determine the temperature of the heat transfer fluid at different points on its circulating path through the system, especially at the outlet of the receiver. Motor control element 470 is used to signal the motor to stop and start responsive to signals of the sensors, as described herein. Signals from the sensors are provided to the controller via relays 492, 444, and 446.

An optical sensor 440 may also be used to control orientation of the collector. For example, nightfall may be sensed and the collector returned to a predetermined inclination facing East, awaiting the sunrise, overriding the heat sensors. When morning arrives, an optical sensor may generate another signal, used to position the collector so that the heat sensors can thereafter determine the optimal inclination angle. The optical sensor may also generate certain override signals in cloud cover situations, for example.

Thus, the optical sensor is provided for gross adjustment of the inclination angle. It does not control setting of the inclination angle after a threshold temperature is sensed by at least the first heat sensor or the second heat sensor; and the first, second and third heat sensors are provided for fine adjustment of the inclination angle.

A preferred method of making a solar collector according to the invention comprises the steps of: cutting a curved surface in a foam base in the shape of a parabolic trough defined by the general equation $y=x^2/4f$ (wherein f is the focal length); adhering a pliable reflective material to the foam base; assembling the foam base and the reflective material in a cradle; positioning a receiver proximate the focal line of the parabolic trough; and providing a source of heat transfer fluid circulating in a closed loop through the receiver. Except as set forth below, the order of these steps is not critical.

The foam is preferably expanded polystyrene (EPS) having a density of approximately 1.5 lb/ft$^3$, conveniently provided from the manufacturer in 8 ft×4 ft×4 ft blocks.

A preferred method of cutting the foam base 20, so that it has the shape of a parabolic trough, involves the use of CNC. CNC is a computer-controlled machine tool—a powered mechanical device that fabricates components by the selective removal of material responsive to programmed commands. An important aspect of the invention has been in the selection of materials that are suitable for use in a CNC apparatus, and in particular a hot-wire CNC apparatus, so that this technology can be integrated in the manufacture of solar collectors at relatively low cost. Hot wire CNC methods have conventionally been used to fabricate foam prototypes, but have not heretofore been adapted to form structural elements of a solar collector base.

A hot-wire foam cutter consists of a thin, taut metal wire, often made of nichrome or stainless steel, or a thicker wire preformed into a desired shape, which is heated via electrical resistance to approximately 200° C. The blank is provided on an x-y table which has the ability to move according to dimensions programmed into the CNC machine. The dimensions are conveniently provided to the machine in the form of a computer aided design (CAD) file. As the wire is passed through the material to be cut, the heat from the wire vaporizes the material just in advance of contact. It is preferred, but not critical that the foam base is formed as a single piece or in pieces which determine the focal properties of the reflector.

After the parabolic surface of the foam base is cut, pliable reflector material is adhered to a foam base 20. As a practical matter, the polished aluminum sheet metal material can only be conformed accurately to the surface of the foam with an adhesive. A suitable adhesive may be selected from those known in the art and conventionally used in construction. An important feature of the method according to the invention is that the base, a structural member, is made out of foam, which is formed to precise dimensions at reduced expense using a CNC cutting machine.

EXAMPLE

A working parabolic trough collector was made with the materials and according to the methods described above. The foam base was cut from a single piece of 8'×4'×4' expanded polystyrene foam. Utilizing a single blank ensured accurate dimensions for the reflective surface. The dimensions of the foam base were provided to the hot wire CNC apparatus in the form of a CAD file. Thus, the overall length of the base was about 8 feet, and the width was about 4 feet.

The reflector was formed from polished aluminum sheeting which came from the manufacturer in sheet form having a width of 49¼ inches. The reflector was adhered to the foam base with Liquid Nail® adhesive. After being applied to the base, the width of the reflector (side-to-side) was about 46 inches, and the reflector area was about 2.76 m$^2$.

The cradle was provided with holes for the receiver element on the south side wall of the cradle and the reflector and base were assembled in the cradle. Insulation was provided on the sides of the cradle parallel to the longitudinal axis of the collector, above the surface of the base and below the cover. The reflector and base were assembled as a unit into the cradle. The distance from the bottom of the cradle to the cover was about 18 inches. The total weight of the base, reflector and cradle was about 68 lbs. Insulation was provided on the wall on the south side of the cradle, and a reflective polished aluminum surface was glued in place on the north side wall of the cradle.

To position the receiver along the focal line of the collector, the calculated focal point was marked on the wall on opposite ends of the collector. Once the receiver was positioned in the calculated position, and solar radiation was incident on the pipe, the position was adjusted by using a temperature sensor and locating the receiver at the position where the highest temperature was recorded.

A pump and a 75 gallon storage tank were included to circulate water which was used as the heat transfer fluid. The temperature of the water entering and exiting the receiver was measured. At a constant flow rate of 2.25 gallons per minute, a 3° C. temperature difference between inflow and outflow was observed. The receiver volume was about 1.5 liters. Average outside temperature was 20° C. The average temperature in the space under the cover was about 45° C. In these conditions, the collector generated heat in an amount of 0.643 kW/m$^2$. Direct solar radiation estimated for the New York area during the period of operation was 1000 Watts/m$^2$ (based on publicly available data). Thus, the thermal efficiency of the unit was 64.3 percent.

The collector was oriented with the longitudinal axis running North to South. The controller was responsive to a low light signal from the optical sensor to return the unit to a parked state, facing East, awaiting the rising sun. The controller was set so that operation of the pump started when the temperature of water in the receiver reached 85° C. The full range of motion of the collector was 170 degrees, East to West. Movement of the reflector was controlled by a linear DC motor.

The foregoing example is intended to be non-limiting. One of ordinary skill in the art would be able to scale the design up or down.

The foregoing description of the preferred embodiments is for illustration only, and is not to be deemed limiting of the invention, which is defined by the appended claims.

What is claimed is:

1. A parabolic solar collector, comprising:
a parabolic reflector having a focal line;
a receiver positioned at the focal line of the reflector carrying a heat transfer fluid;
a foam base in the shape of a parabolic trough determining the focal line and having a receiver positioned along the focal line parallel to a longitudinal axis of the parabolic trough attached to and supporting the reflector,
a rigid cradle supporting the foam base and surrounding the receiver;
wherein the receiver comprises a plurality of individual inflow conduits for transporting heat transfer fluid in a first direction along the longitudinal axis of the solar collector, and an outflow conduit transporting heated heat transfer fluid in a second direction along the longitudinal axis of the solar collector, opposite the first direction;
wherein said inflow conduits are positioned above and in contact with the outflow conduit to absorb heat conducted from the outflow conduit upward in a direction perpendicular to the longitudinal axis of the solar collector, and wherein the outflow conduit has a diameter larger than the diameter of the individual inflow conduits.

2. The parabolic solar collector according to claim 1, wherein the receiver is coated with a silicone polymer based coating and the absorptivity of the coated receiver for solar radiation having a wavelength less than 5 microns is at least 88 percent.

3. A parabolic solar collector, comprising:
a parabolic reflector having a focal line and pivoting about a shaft;
a receiver positioned at the focal line of the reflector carrying a heat transfer fluid;
a foam base attached to and supporting the reflector, the foam base having a curved surface determining the focal line; and
a rigid cradle supporting the foam base and surrounding the receiver;
a heat transfer fluid storage container;
a pump;
a circulating heat transfer fluid;
at least one fluid temperature sensor adapted to measure the temperature of the heat transfer fluid; and
a tracking system including (1) a motor adapted to adjust an angle of inclination of the reflector about the shaft; (2) at least one optical sensor; (3) at least a first heat sensor and a second heat sensor, each of said first and second heat sensors being positioned on opposite sides of a longitudinal axis defined by the receiver; and (4) a controller receiving a signal from the heat sensors and the optical sensor and operatively connected with the motor to set the inclination angle of the reflector;
wherein the inclination angle of the reflector about the shaft is controlled in a direction toward the first or second heat sensor sensing lower temperature;
wherein the controller is responsive to a signal from the fluid temperature sensor to control operation of the pump;
wherein the controller is responsive to a low-light signal from the optical sensor to control operation of the motor to return the inclination angle of the collector to a parked state.

4. A receiver for a parabolic solar collector adapted to be positioned along a longitudinal axis of the collector, comprising:
two inflow conduits carrying a heat transfer fluid in a first direction along the longitudinal axis; and
one outflow conduit in fluid communication with the plurality of inflow conduits and carrying the heat transfer fluid in a second direction along the longitudinal axis, opposite the first direction,
wherein the inflow conduits are positioned above and in contact with the outflow conduit to absorb heat conducted from the outflow conduit upward in a direction perpendicular to the longitudinal axis of the solar collector, wherein the diameter of the outflow conduit is larger than the diameter of the individual inflow conduits, and wherein the combined outside diameter of the two inflow conduits is greater than the diameter of the outflow conduit.

5. The receiver according to claim 4, further comprising a silicone polymer based coating, yielding an absorptivity of the receiver for solar radiation at wavelengths less than 5 microns of greater than 0.88.

6. A tracking and control system in a parabolic solar collector having a receiver positioned along the focal line on a longitudinal axis thereof, wherein the reflector is adapted for pivoting motion about the longitudinal axis to obtain different inclination angles, the tracking and control system comprising:
a motor adapted to pivot the collector to an inclination angle;
an optical sensor;
a first heat sensor located on a first side of the longitudinal axis defined by the receiver;
a second heat sensor located on a side of said longitudinal axis opposite said first side;
a third heat sensor located under the receiver and between the first and second heat sensors; and
a controller responsive to the optical sensor, the first heat sensor and the second heat sensor to set the inclination angle of the reflector and responsive to a signal from the third heat sensor to inhibit action of the motor when the temperature signal from the third heat sensor is higher than the temperature sensed by either the first or second heat sensors.

7. The tracking and control system according to claim 6,
wherein the optical sensor is provided for gross adjustment of the inclination angle and does not control setting of the inclination angle after a threshold temperature is sensed by at least the first heat sensor or the second heat sensor; and
wherein the first heat sensor and the second heat sensor are provided for fine adjustment of the inclination angle, the movement of inclination angle being in a direction toward the first or second heat sensor sensing the lower heat, so that the inclination angle is set to minimize the temperature difference between the first heat sensor, and maximize the temperature sensed by the third heat sensor.

8. The tracking and control system according to claim 6, further comprising a fluid temperature sensor adapted to measure the temperature of a heat transfer fluid in the receiver, and wherein the control system is responsive to a signal from the fluid temperature sensor.

* * * * *